(12) United States Patent
Harris et al.

(10) Patent No.: US 6,684,283 B1
(45) Date of Patent: Jan. 27, 2004

(54) METHOD FOR INTERFACING A CARDBAY CARD TO THE HOST SYSTEM BY INDICATING A 16-BIT OR CARDBUS PC CARD INSERTION TO HOST SOFTWARE

(75) Inventors: Will F. Harris, Dallas, TX (US); Neil G. Morrow, McKinney, TX (US); Keith R. Mowery, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 501 days.

(21) Appl. No.: 09/804,802

(22) Filed: Mar. 13, 2001

(51) Int. Cl.[7] .............................. G06F 13/00; G06F 3/00
(52) U.S. Cl. ........................ 710/302; 710/10; 713/1; 711/115
(58) Field of Search ........................ 710/100, 300–304, 710/104, 8–19; 713/1, 2, 100; 711/115

(56) References Cited

U.S. PATENT DOCUMENTS 5,671,368 A * 9/1997 Chan et al. ................. 710/301
5,918,028 A * 6/1999 Silverthorn et al. ........ 710/306
6,438,638 B1 * 8/2002 Jones et al. ................. 710/301
6,470,284 B1 * 10/2002 Oh et al. ..................... 702/64

* cited by examiner

Primary Examiner—Sumati Lefkowitz
(74) Attorney, Agent, or Firm—William B. Kempler; W. James Brady, III; Frederick J. Telecky, Jr.

(57) ABSTRACT

The present invention provides a method, system and apparatus of interfacing a CardBay device (520) using existing Card and Socket Services (CSS) software (530). A CardBay controller (515) responds to card queries to indicate a pseudo card configuration which the CSS software (530) will recognize and support without the need for modification. The CardBay controller (515) further overrides the power control request generated in response to the pseudo card configuration information and signals a power control based on the voltage combination associated with the actual CardBay device (520). The controller also intercepts CIS read commands and responds with a CIS recognizable and specific to the inserted card. The controller (515) can further intercept legacy driver accesses and convert them into CardBay recognized accesses.

24 Claims, 2 Drawing Sheets

METHOD FOR INTERFACING A CARDBAY CARD TO THE HOST SYSTEM BY INDICATING A 16-BIT OR CARDBUS PC CARD INSERTION TO HOST SOFTWARE

BACKGROUND OF THE INVENTION

1. Technical Field of the Invention

The present invention relates generally to the field of computer peripherals and, more particularly, to a method, system and apparatus to interface a CardBay card through the standard PC card form factor.

2. Description of Related Art

Today, PC card technology is used in mobile computing platforms ranging from high performance full size notebook computers to ultra-portable specialized function devices, such as personal organizers and cameras. As portable platforms continue to diversify in form factor and decrease in power consumption, add-in card technologies must mirror the compactness and energy efficiency of the portable host system. Future mobile systems will need user installable, modular add-in capabilities, in both card and storage form factors, in order to support standardized system configurations.

Future mobile systems are also evolving to a new I/O technology based on more modern, popular serial buses. The industry's evolution is a drive to "layer" the future add-in capabilities atop these newer buses. CardBay has emerged as the standard embraced by the mobile industry as the best means of meeting these evolving market needs. This emerging standard outlines how add-ins will be direct evolutionary cousins of today's PC cards offering the expected set of PC card functions, along with enhancements that meet the changing needs of mobile technology.

Personal Computer Memory Card International Association ("PCMCIA") compatible devices such as modems, memory modules, and disc controllers, for example, are well known. The PCMCIA standard PC card interface defines a physical size and electrical interconnection for each class of computer peripherals. The size of each PCMCIA device is approximately that of a credit card, and each device connects mechanically and electrically through a standard connector to a host computer such as a notebook PC.

The PC card standard further defines a software architecture to provide "plug and play" capabilities across of range of products. For example, host software known as Card and Socket Services ("CSS") is an interface that masks the hardware implementation from card vendor drivers (ie, avoids requiring that the card driver communicate directly with any particular chip) and manages system resources such as interrupt assignment and memory windows for PC cards.

Although CardBay can offer new functionality to the PC Card Slot, existing CSS software, for example, will not recognize or support the new functionalities offered by CardBay or CardBay type technology. New PCMCIA compatible peripherals generally require specialized software and/or hardware, to interact with a peripheral access to the PC card interface, leading to large development cost, long development schedules and/or expensive adapters.

SUMMARY OF THE INVENTION

The present invention achieves technical advantages as a method, system and apparatus for interfacing a CardBay device using existing CardBus and 16-bit card CSS software. A CardBay controller responds to card queries to indicate a pseudo card configuration which the host will recognize and support without the need for modified CSS software. The CardBay controller further overrides the power control request generated in response to the pseudo card configuration information and signals a power control request based on the voltage combination associated with the actual CardBay device. The controller further intercepts CIS read commands and responds with a CIS which is specific for the inserted card. The controller further intercepts driver accesses and converts them into accesses that the CardBay device recognizes.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Figure 1:
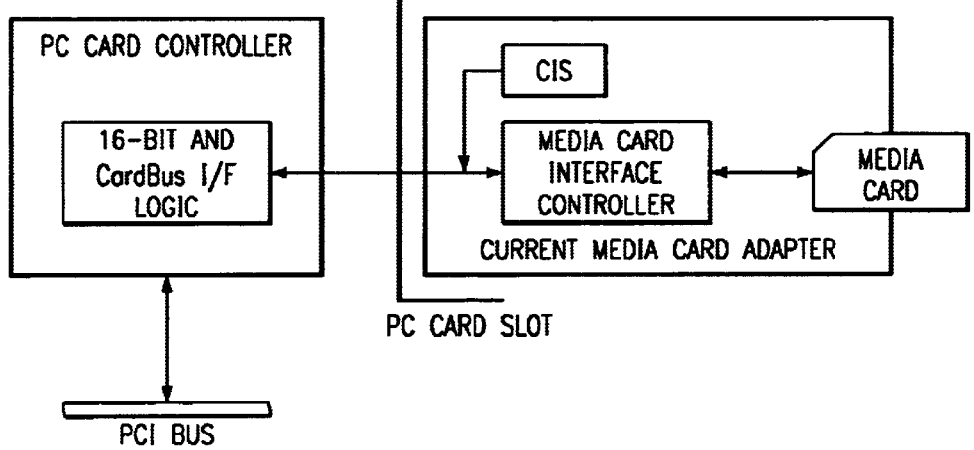
FIG. 1 illustrates a block diagram of a current media card adapter interface system.

In a current system, there are two basic ways for a user to access a media card, depending on the system implementation. The most common way is through the use of an adapter card that contains logic to translate from the media card interface to the PC Card interface as shown in FIG. 1. This method is good in that it uses the existing PC Card slot on the notebook; however, these adapter cards are very expensive because of the translation logic on the adapter card.

Figure 2:
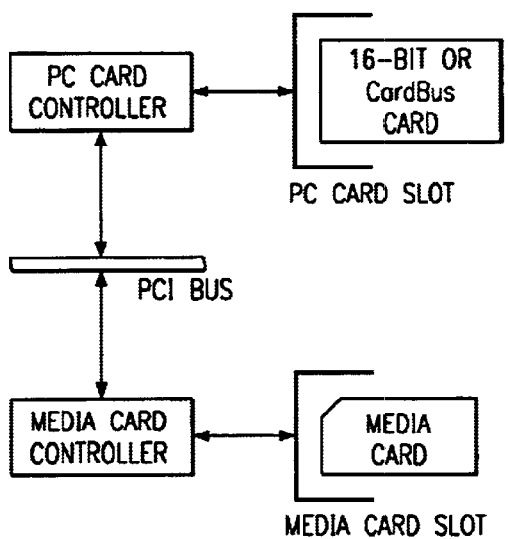
FIG. 2 illustrates a block diagram of a current media and PC Card interface system.

FIG. 2 illustrates the other basic method in which the system has a dedicated slot specifically for the media card. In such a system, the media card controller is either a dedicated chip or a separate function of an existing chip. The problem with this method is that the system must have the additional space for the separate chip and media card slot. Since there are several different types of media cards available, this solution is undesirable because it restricts the user to a certain type of media card.

In accordance with an aspect of the present invention, logic similar to that currently used on media card adapter cards is integrated into a PC card controller which is integral to the present CardBay system and method. Among other advantages, the present approach allows for inexpensive passive CardBay adapters for media cards. Media cards include SmartMedia cards, MultiMedia cards, Secure Digital cards, Memory Stick cards, Smart Cards and other media type cards. The present approach also allows for CardBay cards with a USB interface.

Currently, when a 16-bit or CardBus card is inserted into a PC card slot, the host controller determines the type of card inserted. If the inserted card is a 16-bit or CardBus card, Card and Socket Services (CSS) applies power to the inserted card by writing the appropriate voltage combination to a Socket Control Register. However, if a CardBay card is inserted, the legacy CSS will not recognize or support the operation of the new card.

Figure 3:
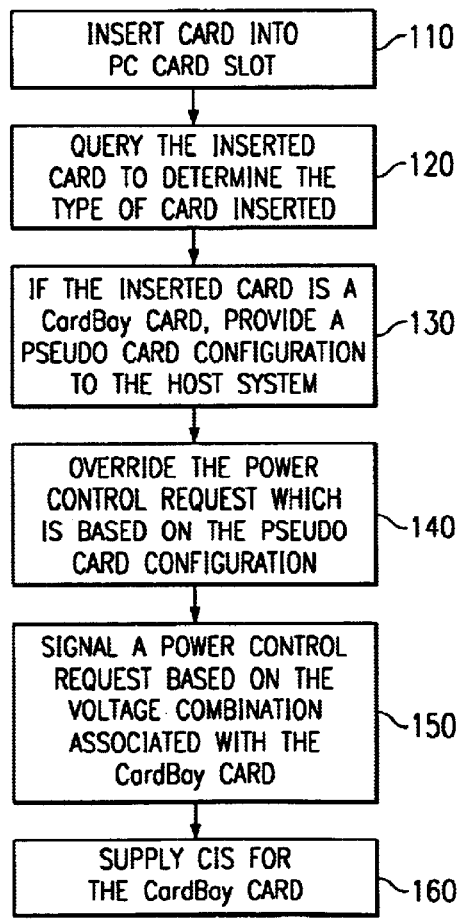
FIG. 3 shows a method of employing a CardBay device in accordance with an embodiment of the present invention.

Referring now to FIG. 3 there is shown a flow diagram of a method of employing a CardBay card using legacy software in accordance with an aspect of the of the present invention. The CardBay card is first coupled 110 to the host system. Subsequent to insertion, the inserted card is queried 120 to determine the card characteristics for further operation. If the inserted card is a CardBay type card, a pseudo card configuration 130 is enabled. The pseudo card configuration is a configuration which the legacy software is known to recognize and support. In an exemplary embodiment, the pseudo card configuration is a configuration indicating that a 16-bit card or a CardBus card is inserted in the PC card slot.

The method further includes: overriding 140 a power control request sent in response to and based on the pseudo card configuration; and enabling a power control request based on the voltage combination indicated by the true card configuration 150 of the inserted CardBay card. Subsequently, the appropriate power is applied to the inserted CardBay card. Additionally, the legacy CSS software enables CIS read commands to the inserted card to further determine the inserted card characteristics. However, CardBay cards do not include a CIS which the legacy software can read and/or recognize. Therefore, in accordance with the present invention, CIS read commands sent to the inserted card are intercepted and a CIS that is specific for the inserted CardBay card and that appears to the host system to come from the CardBay card is sent in response to the intercepted CIS read command. Further, driver accesses to the inserted card are intercepted by the card controller and converted into accesses which the CardBay card can recognize.

Figure 4:
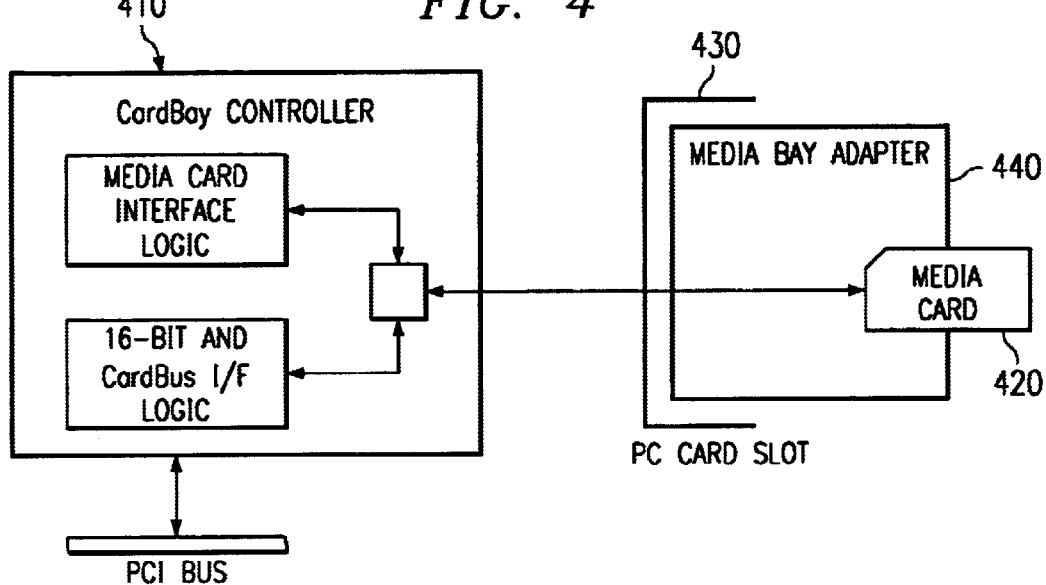
FIG. 4 illustrates a block diagram of a CardBay controller and card interface in accordance with the present invention.

Referring now to FIG. 4 there is illustrated a block diagram of a CardBay controller 410 in accordance with an embodiment of the present invention. As shown, the CardBay controller 410 is coupled to a system bus (such as a PCI bus) for communication with other system components. A CardBay card or specific media card 420 is coupled to the CardBay controller 410 through a standard 68-pin PC card interface 430, for example, typically used for CardBus and 16-bit cards. For insertion into the PC card interface 430, a simple adapter 440 may be required and may be specific to the type of media card used. A type of media card interface logic used in the more expensive and complex media card adapters (see FIG. 1) is integrated on the present CardBay controller 410. The CardBay controller 410 also includes card detect logic which enables the CardBay controller 410 to determine if an inserted card is a 16-bit, CardBus, or CardBay card. The CardBay controller 410 is further configured to route the appropriate signals (determined by the type of card detected) to the 68-pin PC card interface and the other system components.

Figure 5:
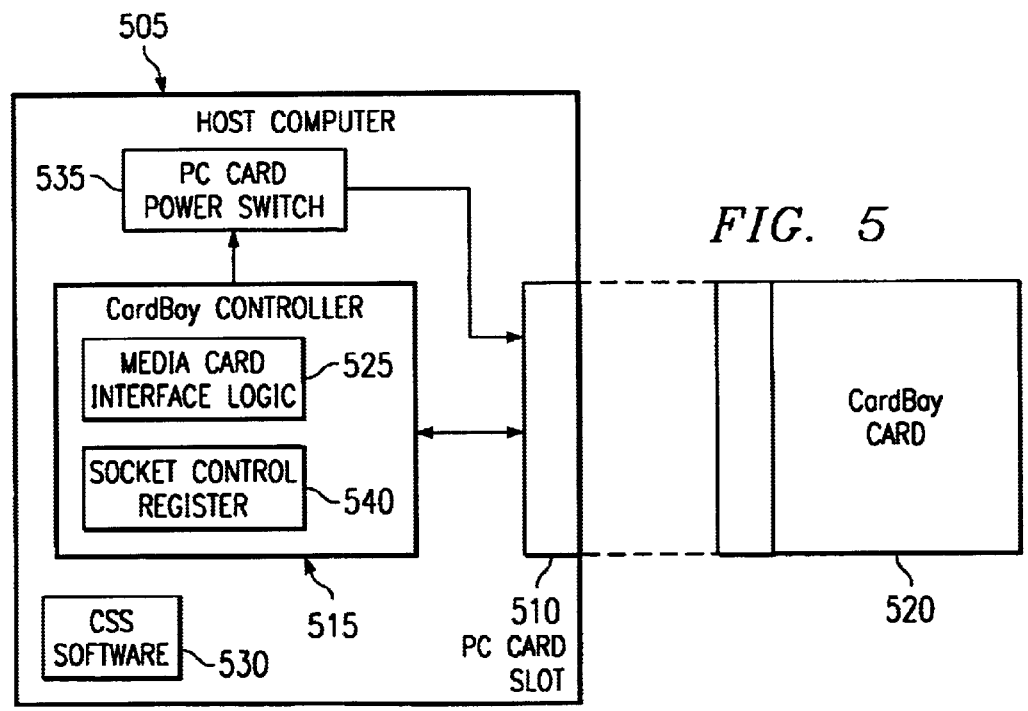
FIG. 5 illustrates a block diagram of a system employing a CardBay device in accordance with an embodiment of the present invention.

Referring now to FIG. 5 there is illustrated a block diagram of a CardBay system in accordance with an embodiment of the present invention. As shown, the CardBay system includes a host computer 505 having a PCMCIA compatible socket or PC card slot 510 into which a CardBay card 520 can be inserted. The host computer 505 can comprise, for example, a notebook computer, or an ultra-portable specialized function device, such as a personal organizer. When a card is inserted into the PC card slot 510, a CardBay controller 515 queries the card to determine the type of card and interfacing details and hopefully the card is of a type recognizable and supportable by the host computer 505. The CardBay controller 515 is an integrated device and in this exemplary embodiment includes a type of media card interface logic 525 used in the more expensive and complex media card adapters (see FIG. 1) and a Socket Control Register 540, but can include other support devices. The CardBay controller 515 can be hardware, software, firmware, or a combination thereof. For example, when a CardBay card is inserted and signals to indicate its actual characteristic, the CardBus and 16-bit CSS software 530 is not able to recognize or support the CardBay card without additional special software or software modification (such as the media card interface logic integrated in prior media card adapters.) However, with the present CardBay system, the CardBay controller 515 detects a CardBay card 520 and sets a register(s) which will indicate to the old CardBus and 16-bit CSS software 530 that a 16-bit card or CardBus card is inserted instead of the actual CardBay Card 520. More specifically, the CardBay controller 515 indicates to the CSS software 530 that the inserted CardBay card 520 is a 16-bit card by setting the 16BITCARD bit in a Socket Present State Register and further signals an interrupt. Alternatively, the CardBay controller 515 indicates to the CSS software 530 that the inserted CardBay card 520 is a CardBus card by setting the CBCARD bit in a Socket Present State Register and further signals an interrupt. The CSS software 530 subsequently services the interrupt and interprets that a "16-bit card" or a "CardBus card" has been inserted.

Having serviced the interrupt and interpreted the inserted card as a "16-bit card," the CSS software 530, enables applied power to the "16-bit card" by writing the appropriate voltage combination to a Socket Control Register 540 associated with the PC Card slot 510 that the CardBay card 520 is inserted into. Alternatively, having serviced the interrupt and interpreted the inserted card as a "CardBus card," the CSS software 530, enables applied power to the "CardBus card" by writing the appropriate voltage combination to a Socket Control Register 540 associated with the PC Card slot 510 that the CardBay card 520 is inserted into. Normally, writes to this register correspond directly to power control request to a PC Card power switch 535. However, since the voltage combination of a 16-bit card or CardBus card does not correspond to the appropriate voltage combination of a CardBay card, the CardBay controller 515 is further configured to override the power control request from the old CSS software 530 and further signals a power control request to the PC Card power switch 535 based upon the voltage combination indicated by the actual inserted CardBay card 520.

Further, to determine the characteristics of the "16-bit card" or "CardBus card," the CSS software will attempt to read the card's Card Information Structure (CIS). Generally, PC Cards include a CIS that the CSS software 530 reads to determine the characteristics of the card, such as type of card, operating voltage, and configuration modes. CardBay cards do not include a CIS; therefore, the CardBay controller 515 includes the CIS or a type of CIS necessary for the CSS software 530 to further determine the characteristics of the card. In accordance with the present invention, the CardBay controller 515 is further configured to intercept the CIS read command to the CardBay card 520 and responds with a CIS that is specific for the inserted CardBay card 520 including, for example, each of the five types of CardBay cards (USB, SmartMedia adapters, MMC/SD adapters, Memory Stick adapters, or Smart Card adapters).

Once the CSS software 530 reads the CIS from the CardBay controller 515, it then loads the appropriate driver based upon the CIS contents. Normally, the driver accesses directly to the card, however, in accordance with the present invention, the CardBay controller 515 is further configured to intercept the 16-bit accesses or CardBus accesses to the CardBay card 520 and convert them into card accesses that the CardBay card 520 recognizes. The converted card accesses are specific to the type of CardBay card inserted.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method of interfacing an advanced card device with a PC card system, said method comprising:
   inserting said advanced card device into a PC card slot associated with said PC card system; and
   signaling a pseudo card configuration subsequent to a host query to determine a type of card inserted, wherein said pseudo card configuration is of a configuration recognizable to said PC card system.

2. The method of claim 1 further comprising:
   signaling a power control request, to said PC card system, based on a voltage combination associated with said advanced card device; and
   signaling a recognizable card information structure for operation support from card and socket services software associated with said PC card system.

3. The method of claim 1, wherein said advanced card device comprises a CardBay card.

4. The method of claim 1, wherein said advanced card device comprises a USB, Smart Media, MMC/SD, Memory Stick or Smart Card.

5. The method of claim 1, wherein said pseudo card configuration comprises a 16-bit card type configuration by setting a 16BITCARD bit in a socket present state register associated with said PC card system.

6. The method of claim 1, wherein said pseudo card configuration comprises a CardBus card type configuration by setting a CBCARD bit in a socket present state register associated with said PC card system.

7. The method of claim 5 further comprising:
   intercepting 16-bit accesses from said PC card system to said advanced card device; and
   converting said 16-bit accesses into accesses recognizable to said advanced card device.

8. The method of claim 6 further comprising:
   intercepting CardBus accesses from said PC card system to said advanced card device; and
   converting said CardBus accesses into accesses recognizable to said advanced card device.

9. The method of claim 1, wherein said PC card system comprises a notebook computer.

10. The method of claim 1 further comprising overriding a power control request from card and socket services software associated with said PC card system which is based on said pseudo card configuration.

11. The method of claim 1 further comprising intercepting a card information structure read command from said PC card system.

12. A system for interfacing an advanced card device with a legacy PC device, said system comprising:
    a PC card slot associated with said legacy PC device for receiving said advanced card device which is configured for insertion into said PC card slot; and
    a controller associated with said advanced card device configured to signal a pseudo card configuration subsequent to a host query to determine a type of card inserted into said PC card slot, wherein said pseudo card configuration is of a configuration recognizable to said legacy PC device.

13. The system of claim 12, wherein said controller further configured to signal a power control request, to said legacy PC device, based on a voltage combination associated with said advanced card device and to signal a recognizable card information structure for operation support from card and socket services software associated with said legacy PC device.

14. The system of claim 12, wherein said advanced card device comprises a CardBay card.

15. The system of claim 12, wherein said advanced card device comprises a USB, SmartMedia, MMC/SD, Memory Stick or Smart Card.

16. The system of claim 12, wherein said pseudo card configuration comprises a 16-bit card type configuration by setting a 16BITCARD bit in a socket present state register associated with said legacy PC device.

17. The system of claim 12, wherein said pseudo card configuration comprises a CardBus card type configuration by setting a CBCARD bit in a socket present state register associated with said legacy PC device.

18. The system of claim 16, wherein said controller is further configured to intercept 16-bit accesses from said legacy PC device to said advanced card devices and convert said 16-bit accesses into accesses recognizable to said advanced card device.

19. The system of claim 17, wherein said controller is further configured to intercept CardBus accesses from said legacy PC device to said advanced card devices and convert said CardBus accesses into accesses recognizable to said advanced card device.

20. The system of claim 12, wherein said legacy PC device comprises a notebook computer.

21. The system of claim 12, wherein said controller is further configured to override a power control request from card and socket services software associated with said legacy PC device which is based on said pseudo card configuration.

22. The system of claim 12, wherein said controller is further configured to intercept a card information structure read command from said legacy PC device.

23. An apparatus for providing additional functionality to a legacy PC device using existing card and socket services software associated with said legacy PC device, said apparatus comprising:
    an advanced card device configured to be insertable into a PC card slot associated with said legacy PC device, wherein said advanced card device comprises instructions for enabling said additional functionality; and
    a controller associated with said advanced card device configured to signal a pseudo card configuration subsequent to a host query to determine a type of card inserted into said PC card slot, wherein said pseudo card configuration is of a configuration recognizable to said legacy PC device.

24. The apparatus of claim 23, wherein said controller further configured to signal a power control request, to said legacy PC device, based on a voltage combination associated with said advanced card device and to signal a recognizable card information structure for operation support from card and socket services software associated with said legacy PC device.

* * * * *